United States Patent Office 3,330,621
Patented July 11, 1967

3,330,621
METHOD OF PRODUCING AMMONIUM SULFATE
Angel Vian-Ortuno, Conrado Iriarte-Fernandez, and Jose Luis Martinez-Castro, Madrid, Spain, assignors to Empresa Auxiliar de la Industria, S.A., Madrid, Spain
No Drawing. Filed May 2, 1963, Ser. No. 278,517
Claims priority, application Spain, May 3, 1962, 276,972
11 Claims. (Cl. 23—119)

The present invention relates to a method of producing ammonium sulfate and, more particularly, the present invention is concerned with producing ammonium sulfate from sulfur dioxide-containing gases.

More specifically, the present invention is concerned with recovery of sulfur dioxide from gases containing the same, particularly from industrial gases which may contain only a very small proportion of sulfur dioxide, and in certain metallurgical processes.

Thus, the present invention is particularly suitable for the treatment of highly diluted gases, i.e. gases containing only a very small proportion of sulfur dioxide such as are formed in the burning of sulfur-containing coal and in certain metallurgical processes.

The conventional methods for recovery of sulfurous gases employ organic absorbent liquids for separating the sulfur dioxide from the residual gases. These methods necessarily entail losses of absorbent liquid, mainly by evaporation and the evaporated relatively expensive absorbent liquids must then be recovered in separate installations. The use of inorganic absorbents requires great quantities of absorbent liquid and more involved methods for oxidizing the absorbed sulfur dioxide. Besides there is the risk of forming undesirable compounds such as polythionates and thiosulfate.

It has also been proposed to use activated carbon as a solid adsorbent. However, activated carbon and the like are found of only very limited practical interest because of the reversible sequence in the adsorption-desorption process, the capacity of such solid adsorbents for treating gases is relatively small per unit of weight of the adsorbent. In addition, thermal energy must be supplied for the desorption step.

It is, therefore, an object of the present invention to provide a method for the recovery of sulfur dioxide from gases, for instance waste gases, which avoids the above discussed difficulties and disadvantages.

It is a further object of the present invention to provide a method of recovering sulfur dioxide in the form of ammonium sulfate from sulfur dioxide-containing gases, which method utilizes a solid material for retaining the sulfur dioxide and can be carried out in a simple and economical manner without requiring external heat.

It is another object of the present invention to provide a method for recovering sulfur dioxide from gases containing the same and converting the sulfur dioxide into ammonium sulfate, which method is carried out with a solid intermediate carrier of the sulfur dioxide and so that substantially no loss of intermediate carrier will take place.

Other objects and advantages of the present invention will become apparent from further reading of the description and of the appended claims.

With the above and other objects in view, the present invention contemplates a method of producing ammonium sulfate from sulfur dioxide-containing gas, comprising the steps of contacting a mass of solid pyridine groups-containing particles with sulfur dioxide-containing gas, thereby binding the sulfur dioxide to the pyridine groups of the particles, adding oxygen to the thus-formed sulfite of the pyridine groups so as to oxidize the same to the sulfate of the pyridine groups, treating the sulfate of the pyridine groups with ammonia, thereby forming ammonium sulfate, and recovering the thus-formed ammonium sulfate.

According to a preferred embodiment of the present invention, the same includes in a method of producing ammonium sulfate from sulfur dioxide-containing gas, the steps of reacting at a temperature of between about 25 and 60° C. sulfur dioxide-containing gas with beads of a cross-linked synthetic resin obtained by copolymerization of between 60 and 85 parts by weight of 2-methyl-5-vinylpyridine with between 40 and 15 parts by weight of paradivinylbenzene, thereby binding the sulfur dioxide to the pyridine groups of the beads, adding oxygen to the thus-formed sulfite of the pyridine groups so as to oxidize the same to the sulfate of the pyridine groups, treating the sulfate of the pyridine groups with ammonia, thereby forming ammonium sulfate, contacting the thus-formed ammonium sulfate-containing beads with an aqueous liquid so as to form an aqueous solution of ammonium sulfate and to substantially restore the mass of solid pyridine groups-containing beads to its original condition, and recovering ammonium sulfate from the aqueous solution.

Surprisingly, it has been found according to the present invention that by passing a sulfur dioxide-containing stream of gas, for instance, through a bed of beads of a solid material of pyridine character such as a vinyl-pyridic resin, the entire sulfur dioxide content of the gas, irrespective of its initial concentration, will be retained by the resin. Furthermore, it was found that the thus retained sulfur dioxide can be easily oxidized to sulfur trioxide by contact with the oxygen of the air, substantially without desorption, and that all of the sulfur dioxide which was initially retained by the resin may be separated therefrom in the form of an ammonium sulfate solution by washing the oxidized bed with an aqueous solution of ammonia. By thus washing out the ammonium sulfate, the solid beads or the like will be regenerated to their original form and thus may be used for retention of additional quantities of sulfur dioxide, followed by oxidation to sulfur trioxide and extraction with ammonia solution.

Broadly, it does not matter what type of solids are used for adsorption or retention of sulfur dioxide, provided that the solids consist of a material containing a pyridine ring or rings, in other words, that the solids possess pyridine nitrogen atoms. The remaining constituents of the compound forming the solid adsorbent material must be so chosen that they are sufficiently stable under the operating conditions. Thus, preferably synthetic polymers or resins which include pyridine rings will be used according to the present invention in the form of solid particles of sufficiently small size so that a large contact surface area between the solid particles and the gas can be established. The synthetic resin must include pyridine nitrogen atoms, however, the remaining constituents of the synthetic resin compound may be chosen from a variety of groups such as alkyl, vinyl, etc. groups.

The synthetic resins or polymers which are utilized according to the present invention must be chemically and physically, particularly thermically, stable under the conditions required for carrying out the present process. Thus, the adsorbent particles must not be weakened or attacked by sulfuric or ammonia solutions of concentrations within the range of up to about 10–15% and must be able to withstand temperatures of up to about 90 or 100° C.

Good results are obtained according to the present invention with synthetic resins obtained by the copolymerization of any vinyl-pyridine, vinyl-alkylpyridine or mixtures thereof, with bifunctional monomers, such as divinylbenzene or other vinylic compounds in suitable proportions. Preferably three-dimensional cross-linked polymers will be used, for instance, the resins derived from the polymerization of 2-methyl-5-vinylpyridine with paradivinylbenzene whereby preferably about 70 parts by weight of 2-methyl-5-vinylpyridine are reacted with about 30 parts by weight of paradivinylbenzene.

It is unimportant for the purpose of the present invention in which manner the pyridic polymer is obtained and how the same is subdivided into solid particles of suitable size and shape. Any one of the methods known in the art for this purpose may be utilized. For instance, solid blocks of the pyridine polymer could be produced and could then be reduced in size, or the polymerization could be carried out so as to obtain beads of the pyridine polymer.

It is also within the scope of the present invention to establish contact between the sulfur dioxide-containing gas and the solid pyridine polymer in any desired manner, for instance in static beds, descending beds, fluidized beds, eruptive beds, etc., depending on the amount of gas to be treated and the rate of flow of the same.

The capacity of the pyridine solid particles to retain sulfur dioxide is practically independent of the concentration of sulfur dioxide in the gas from which the same is to be removed. However, the retention capacity differs with the specific pyridine solid applied and to some extent with the ratio between volume and surface area thereof. The amount of sulfur dioxide which can be retained in many cases will easily reach about 30% of the weight of the pyridine polymer.

Sulfur dioxide will be retained, for instance, by vinyl pyridine solid bodies irrespective of whether the solid bodies are dry or wet. This is of very considerable importance because it will make it unnecessary to dry the sulfur dioxide-containing gases prior to contacting the pyridic polymer therewith.

The oxidation to sulfur trioxide of the sulfur dioxide taken up by the pyridine solids, which preferably is carried out by contact with oxygen or air, requires the presence of moisture at the pyridine solids. This moisture may easily be provided by applying water, or it may be present due to relatively high humidity of the air which is used for supplying oxygen for oxidation of the sulfur dioxide. since only a relatively small proportion of moisture is required in the oxidation step, the same can be simply provided in various ways, for instance by using sufficiently humid air, or by sprinkling the sulfur dioxide-containing pyridine solids after the sulfur dioxide which is to be oxidized has been taken up by the same. It is of course also possible to carry out the sulfur dioxide adsorption in the presence of moisture and in this case it will not be necessary to make additional provisions for supplying moisture during the oxidation step.

Broadly, the retention of sulfur dioxide by the bodies of synthetic polymers including pyridine rings may be carried out at any temperature at which the stability of the pyridine solid bodies is assured, generally between about 15 and 100° C. In order to maintain a retention capacity of said synthetic polymers including pyridine rings such that an amount of sulfur dioxide equal to at least 10% of the weight of said synthetic polymers will be retained, it is desirable to maintain a temperature below 80° C. and best results according to the present invention are obtained within a temperature range of between about 25 and 60° C.

Since the retention of the sulfur dioxide by the pyridine resin is an exothermic process in which somewhat more than 400 Kcal. are produced per kg. of thus retained sulfur dioxide, it will be necessary to cool the mass of pyridine solids unless the gas stream passing through the same is able to dissipate the adsorption solid. Thus, if the gases are too hot at the inlet, or if the gases are very concentrated with respect to sulfur dioxide, for instance the gases obtained in the oxidation roasting of pyrites, cooling will be necessary.

The gases from which sulfur dioxide is to be removed need not be previously treated, except that it is desirable to remove dust from the same in order to avoid contamination of the mass or bed of pyridine solids.

The particulate mass of pyridine solid material, for instance, could be arranged in an adsorption tower and sulfur dioxide-containing gas passed through the tower. Thereafter, the oxidation of the sulfur dioxide attached to the pyridine material can be easily accomplished by the injection of oxygen-containing gas, preferably into the lower portion or beneath the lower portion of the bed of pyridine particles. Oxidation may be carried out at temperatures of up to about 80° C. and care should be taken to prevent overheating particularly in the upper portion of the bed or tower, since at temperatures above 80° C. desorption of not yet oxidized sulfur dioxide may take place.

Since oxidation of the sulfur dioxide to sulfur trioxide is an exothermic reaction releasing about 1000 Kcal./kg. of oxidized sulfur dioxide, the bed should be cooled by means of a suitable refrigerating device, preferably so that in the lower part of the bed or tower a temperature of between about 70 and 80° C., and in the upper part a temperature of between about 30 and 40° C., is maintained during the oxidation step.

It is of course also possible to arrange two towers in sequence with interchangeable inlet and outlet means for the gases passing through the towers, and maintaining each tower in isothermal condition, whereby the tower which is maintained at a temperature of 80° C. acts as oxidation tower, and the other tower which is maintained at a temperature of between 30 and 40° C. or less will act as adsorption tower. As soon as the last tower is saturated, the gas stream is switched so that this last tower will now be used as the oxidation tower, while the first tower, after sulfur trioxide has been removed therefrom in the form of ammonium sulfate, as will be described further below, is then arranged as the adsorption tower. To thus change the direction of the gas flow through the towers, it is only necessary to reverse the inlet and outlet of the gases and to change the degree of refrigeration.

According to each of these methods, the entire sulfur dioxide will be oxidized without appreciable desorption of the same.

As has been pointed out further above, the particulate mass in the tower must be in moist condition during the oxidation step and this can be achieved by any one of the relatively simple methods known in the art, for instance, by incorporating water in the air or oxygen which is blown into the tower or the like, or by keeping or introducing a small amount of water in the upper part of the tower or bed of particulate pyridine solids. The oxidation step is excellently suitable for being carried out by the known technique of fluidized beds whereby it suffices to maintain in the bed an average temperature of between about 60–80° C., which temperature can be easily maintained and controlled by means of refrigerating coils arranged in the bed. It is also easily possible, as indicated above, to maintain the desired degree of moisture in the fluidized bed either by introducing the required water with the oxygen-containing gas stream, or by spraying the bed with water.

It is also possible to carry out the oxidation completely or in part simultaneously with the adsorption of sulfur dioxide by the pyridine material. Thus, if the sulfur dioxide-containing gases also contain oxygen, then at least a portion of the sulfur dioxide of the gas being retained by the pyridine solids will be immediately oxidized to sulfur trioxide.

It must be realized, however, that more or less simultaneous adsorption and oxidation of sulfur dioxide will create more heat and adequate provisions for cooling the bed or mass of pyridine particles must be made.

The sulfur trioxide which is retained by the pyridine solids can be easily washed out of the oxidized bed by means of an aqueous ammonia solution. The concentration of the ammonia in the solution is not critical, however, the amount of ammonia must be of course sufficient for converting the sulfur trioxide into ammonium sulfate. Instead of using an aqueous ammonia solution, it is also possible to contact the sulfur trioxide-containing bed with gaseous ammonia or with ammonia-containing gas, and thereafter to wash the bed with water or an aqueous liquid in order to dissolve the thus formed ammonium sulfate and to separate the same from the bed.

When using an aqueous solution of ammonia, the same may be recycled through the bed until all of the sulfur trioxide has been converted into ammonium sulfate, whereupon the bed, preferably after being washed with water, will be ready for taking up additional quantities of sulfur dioxide.

The solution of ammonium sulfate which is obtained thereby may then be concentrated and ammonium sulfate recovered therefrom by crystallization or evaporation in accordance with conventional methods.

It is particularly advantageous in large scale operation of the process of the present invention to elute the sulfur trioxide-containing solids with a concentrated cold solution of ammonium sulfate which contains additional ammonia so that upon contact with the sulfur trioxide-containing bed, additional ammonia sulfate will be formed and dissolved. Due to the exothermic nature of the elution process freeing about 20 Kcal./kg. of ammonium sulfate, the temperature of the solution and thereby the solubility of the ammonium sulfate in the same will rise. In this manner a warm concentrated solution of ammonium sulfate is obtained. By simply cooling the warm solution in a conventional industrial crystallizer, crystallized ammonium sulfate will be obtained as well as mother liquor which still contains the amount of ammonium sulfate soluble at the lower temperature to which the solution has been cooled. Upon adding ammonia to the mother liquor, the same may be used again to elute sulfur trioxide-containing pyridine solid particles.

The following examples are given as illustrative only of the present invention without, however, limiting the invention to the specific details of the examples.

*Example 1*

190 standard cubic meters of a gas derived from a metallurgical furnace are passed in upward direction through a tower having a diameter of 35 cm. The tower is filled to a height of 2.5 meters with a bed consisting of 120 kg. of resin beads of about 0.5–2 mm. of diameter obtained in the copolymerization of 84 kg. of 2-methyl-5-vinylpyridine with 36 kg. of paradivinylbenzene. The portion of the tower containing the bed is provided with refrigerating coils for controlling the temperature of the bed during the exothermic reactions taking place therein.

The gas composition is as follows:

| | Percent |
|---|---|
| $SO_2$ | 2.3 |
| $CO_2$ | 17.6 |
| $N_2$ | 80.1 |
| | 100.0 |

The rate of flow of the gas through the tower equals one standard cubic meter per minute. Passage of the 190 standard cubic meters of gas thus will take 3 hours 10 minutes. The gas is introduced at a temperature of 30° C. and the bed is cooled in such a manner that the temperature in the tower will be maintained at 60° C. The exhaust gases leaving the tower are totally free of sulfur dioxide.

After completing passage of the sulfur dioxide-containing gas through the tower, 20 liters of water are introduced from the top of the tower into the bed of resin beads to moisten the same, and immediately thereafter 50 standard cubic meters of air are passed through the bed in upward direction at a rate of flow of 1 standard cubic meter per minute. During this operation, i.e., the oxidation of the adsorbed sulfur dioxide, the bed is maintained at 75° C. Upon completion of the oxidation, the passage of air through the tower is stopped and the bed is eluted with 250 liters of an aqueous solution of ammonia having a density of 11.6° Be. The solution is recycled through the bed until the beads are freed of sulfur trioxide. The solution is then withdrawn and by evaporation of the same 25.7 kg. of ammonium sulfate are obtained.

The resin bed in the tower is then washed with 10 liters of water, thereafter it is ready to accept sulfur dioxide from sulfur dioxide-containing gas passed through the tower.

*Example 2*

2000 standard cubic meters of a stack gas of the following composition:

| | Percent |
|---|---|
| $CO_2$ | 11.29 |
| $H_2O$ | 6.83 |
| $SO_2$ | 0.15 |
| $O_2$ | 6.02 |
| $N_2$ | 75.71 |
| | 100.00 | are passed through the resin bead bed described in Example 1 at a rate of flow of 1.5 standard cubic meters per minute. The temperature of the gas upon introduction of the same is 50° C. and the bed is maintained at a temperature of about 65° C. During passage of the gas through the bed, all of the sulfur dioxide contained in the gas will be retained in the bed and simultaneously about 70% of the thus retained sulfur dioxide will be oxidized to sulfur trioxide. The moisture required for oxidation of the sulfur dioxide is provided by the water content of the gas.

After completion of passage of the stack gas through the bed, two standard cubic meters of technical oxygen gas are passed therethrough in order to complete the oxidation of sulfur dioxide to sulfur trioxide.

Thereafter, the bed is treated with 200 liters of a 40% aqueous ammonium sulfate solution to which 4 kg. of dry ammonia had been added. Thereafter, the bed is washed with 100 litters of a 10.5° Be. aqueous solution of ammonia which then is added to the previously used ammonium sulfate solution.

From the thus combined solutions, 17.7 kg. of an ammonium sulfate are obtained by crystallization and the mother liquor, as well as the resin bed are then ready for being used in a repetition of the process.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing ammonium sulfate from sulfur dioxide-containing gas, comprising the steps of contacting in the presence of water a mass consisting essentially of particles of a synthetic polymer including pyridine rings and being resistant to sulfuric acid and ammonia solutions of at least up to 10% concentration and able to withstand temperatures of up to between about 90–100° C. with sulfur dioxide-containing gas until at least a portion of said sulfur dioxide is bound to the pyridine rings of said synthetic polymer under formation of a sulfite; adding oxygen so as to oxidize the thus formed sulfite to sulfate bound to said pyridine rings; treating said synthetic polymer including said sulfate bound to said pyridine rings with ammonia so as to form ammonium sulfate of said bound sulfate and said ammonia; and recovering the thus formed ammonium sulfate.

2. A method as defined in claim 1, wherein said synthetic polymer including pyridine rings is a cross-linked polymer.

3. A method as defined in claim 2, wherein said contacting of said polymer with said sulfur dioxide-containing gas is carried out by passing sulfur dioxide-containing gas through a bed formed of particles of said synthetic cross-linked polymer including pyridine rings.

4. A method as defined in claim 2, wherein after formation of said ammonium sulfate an aqueous liquid is introduced so as to form an aqueous solution of ammonium sulfate and to substantially restore said mass of particles of a synthetic cross-linked polymer including pyridine rings to its original condition.

5. A method as defined in claim 2, wherein said mass of solid particles consists essentially of a synthetic resin obtained by copolymerization of vinylpyridic monomers with divinylbenzene.

6. A method as defined in claim 2, wherein said mass of solid particles consists essentially of a synthetic resin obtained by copolymerization of 2-methyl-5-vinylpyridine with paradivinylbenzene.

7. A method as defined in claim 6, wherein said mass of solid particles consists essentially of a synthetic resin obtained by copolymerization of between 60 and 85 parts by weight of 2-methyl-5-vinylpyridine with between 40 and 15 parts by weight of paradivinylbenzene.

8. A method as defined in claim 2, wherein said contacting of said polymer with sulfur dioxide-containing gas is carried out at a temperature between about 25 and 60° C.

9. A method as defined in claim 3, wherein said adding oxygen is carried out by blowing a free oxygen-containing gas through said bed.

10. A method as defined in claim 1, which comprises the steps of passing sulfur dioxide-containing gas through a bed formed of solid particles of a cross-linked synthetic polymer including pyridine rings, and being resistant to sulfuric acid and ammonia solutions of at least up to 10% concentration and able to withstand temperatures of up to between about 90–100° C., so as to bind said sulfur dioxide of said gas to said pyridine rings of said cross-linked synthetic polymer; blowing oxygen-containing gas through said bed of solid polymer particles including the thus formed sulfite bound to said pyridine rings so as to convert said sulfite to sulfate; washing the thus formed sulfate-containing polymer particles with an aqueous ammonia solution so as to form aqueous ammonium sulfate and to substantially restore said mass of particles of synthetic cross-linked polymer including pryidine rings to its original condition; separating the thus formed aqueous solution of ammonium sulfate; and subjecting the separated ammonium sulfate-containing solution to crystallization so as to recover crystallized ammonium sulfate therefrom.

11. A method as defined in claim 2, wherein said synthetic polymer including said sulfate bound to said pyridine rings is contacted with gaseous ammonia so as to transform said sulfate into ammonium sulfate; and thereafter, the thus formed bed of solid particles including ammonium sulfate is washed with an aqueous liquid so as to form an aqueous solution of ammonium sulfate adapted for the recovery of ammonium sulfate therefrom.

References Cited
UNITED STATES PATENTS

| | | | |
|---|---|---|---|
| 2,285,750 | 6/1942 | Swain | 210—37 |
| 2,970,039 | 1/1961 | Vian-Ortuno | 23—119 |

FOREIGN PATENTS 805,853  12/1958  Great Britain.

OSCAR R. VERTIZ, Primary Examiner.

EARL C. THOMAS, Examiner.